United States Patent [19]
Dubois

[11] Patent Number: 5,921,589
[45] Date of Patent: Jul. 13, 1999

[54] VIBRATION ISOLATING FLANGE ASSEMBLY

[75] Inventor: Neil J. Dubois, Cranston, R.I.

[73] Assignee: The United States of America as represented by the Secretary of the Navy, Washington, D.C.

[21] Appl. No.: 08/976,133

[22] Filed: Sep. 29, 1997

[51] Int. Cl.$^6$ ........................................... F16L 11/12
[52] U.S. Cl. .................. 285/49; 285/139.2; 285/139.3; 285/141.1; 285/148.23; 285/192; 285/363
[58] Field of Search .................. 285/48, 49, 50, 285/361, 363, 139.2, 139.3, 141.1, 192; 16/2.2

[56] References Cited

U.S. PATENT DOCUMENTS

| 420,391 | 1/1890 | Rice | 285/50 |
|---|---|---|---|
| 2,862,040 | 11/1958 | Curran | 285/48 X |
| 4,958,860 | 9/1990 | Akitsu | 285/49 |

FOREIGN PATENT DOCUMENTS

| 2062479 | 7/1972 | Germany | 285/48 |
|---|---|---|---|
| 1548585 | 3/1990 | Russian Federation | 285/363 |
| 232191 | 8/1944 | Switzerland | 285/363 |
| 1260143 | 1/1972 | United Kingdom | 285/49 |

*Primary Examiner*—Dave W. Arola
*Attorney, Agent, or Firm*—Michael J. McGowan; Prithvi C. Lall; James M. Kasischke

[57] ABSTRACT

A vibration isolating flange mount assembly for a pipe has a vibration absorbing gasket and fastener recesses having a vibration dampening material disposed therein to provide a fluid seal between the pipe and a flooded structure and to isolate pipe vibrations.

8 Claims, 1 Drawing Sheet

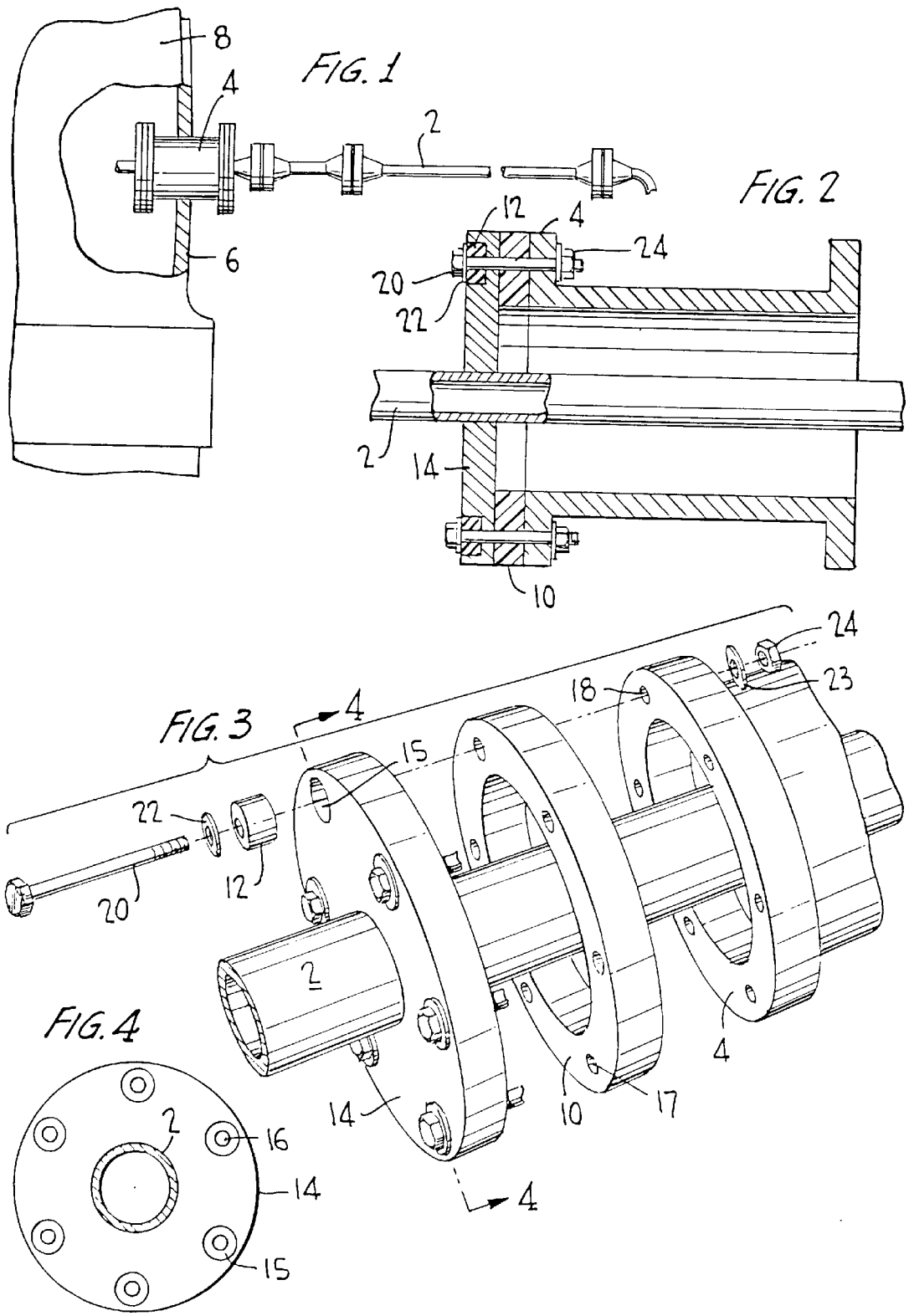

VIBRATION ISOLATING FLANGE ASSEMBLY

STATEMENT OF GOVERNMENT INTEREST

The invention described herein may be manufactured and used by or for the Government of the United States of America for governmental purposes without payment of any royalties thereon or therefor.

BACKGROUND OF THE INVENTION

(1) Field of the Invention

The present invention relates to a novel apparatus for isolating vibration in a pipe passing into a flooded structure. More particularly, the invention relates to a flange assembly useful in sealing the flooded structure and preventing vibration caused by flow inside the pipe from significantly affecting acoustic testing occurring within the flooded structure.

(2) Description of the Prior Art

Large testing structures are often used for military testing. For example, the acoustic measurement of noise caused by torpedo drive train systems is sometimes measured in large fluid filled structures into which the torpedo may be mounted and tested. During one such acoustic measurement, high pressure steam is used to power the torpedo drive train. The steam is transported from a steam generation source, through the testing structure's wall and then to the object or vehicle which is the focus of the test. In order to accurately measure noises generated by the vehicle only, vibration of the steam supply pipe must be isolated. Such vibration is caused by turbulent flow within the pipe, and may skew accuracy of acoustic measurements if allowed to effect the testing structure. There is a need to isolate such vibrations.

Various flange assemblies are known in the prior art, such as described in U.S. Pat. Nos. 3,275,346; 4,552,386; 4,620,731; 4,637,641; and 4,667,989. However, such flange assemblies are replete with shortcomings that detract from their usefulness for uses as herein contemplated.

SUMMARY OF THE INVENTION

It is a primary object of the present invention to provide a flange assembly which dampens or isolates vibrational energy.

It is a further primary object of the present invention to provide a flange assembly which dampens or isolates vibrational energy of a pipe which passes through the wall of an acoustic testing structure.

It is a further object of the present intention to provide a flange assembly which dampens or isolates vibrational energy and which is simple in construction and inexpensive to manufacture.

The objects are accomplished with the invention which is directed to a vibration isolating pipe flange assembly for use with a testing structure, particularly a liquid filled structure used for acoustic testing of submersible objects. The flange provides a fluid seal and isolates vibration in the pipe by providing an elastomeric sealing gasket and annular bushings which prevent any metal to metal contact thereby preventing significant transmission of mechanical energies from the pipe to the testing structure.

The invention comprises a pipe having a flange having recesses on one side of the flange filled with vibration damping material. A vibration damping gasket is placed between the pipe flange and a wall flange, and the assembly is fastened together with no metal to metal contact between the flanges or between the fastener and the pipe flange.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein:

FIG. 1 is a perspective view of a test structure;

FIG. 2 is a partial sectional view of the flange assembly of the present invention;

FIG. 3 is an enlarged exploded view of the flange assembly of the present invention;

FIG. 4 an end view of the present invention along line 4—4 of FIG. 3.

DESCRIPTION OF THE PREFERRED EMBODIMENT

Referring to FIG. 1, in accordance with the present invention, a steam pipe 2 passes through a wall 6 via a wall flange 4 and into a testing structure 8. The testing structure 8 defines a testing chamber, which is often flooded for acoustic testing of submersible objects. Such a steam pipe 2 often vibrates from flow occurring therein, with the flange of the present invention damping such vibration.

The invention is shown in cross section in FIG. 2. The steam pipe 2 passes through the wall flange 4. The wall flange 4 is commonly connected to the wall 6 by a welded connection. A pipe flange 14 is attached to the steam pipe 2. A gasket 10 is provided between the pipe flange 14 and the wall flange 4 to isolate vibration occurring in pipe 2. The preferred gasket material is compatible with the material of the pipe, possesses good damping properties, provides a good fluid seal, is easily moldable, is long term stable, and exhibits very little water absorption over time. One such material is the polyurethane compound Hexcel Uralite 3140 which exhibits exceptional toughness, dimensional stability, and cut resistance thereby preventing crack propagation through the gasket. Other materials may be selected according to the temperature, corrositivity, pressure, etc. of the contents of the testing chamber and the amount of damping needed.

The invention provides a seal as shown in FIG. 3. Gasket 10 is fastened, here by bolt 20, between the pipe flange 14 and the wall flange 4. In order to isolate vibrational energy and prevent it from traveling through the bolted connection, an annular bushing 12, preferably of the same material as the gasket 10, is provided. The annular bushing 12 is seated in a plurality of recesses 15, as in FIG. 4, spaced around the pipe flange 14 with the recesses 15 being on the side of the pipe flange 14 opposite the gasket 10. A retaining washer 22, if used with bolt 20, is preferably slightly smaller in diameter than the annular bushing 12, thereby preventing metal to metal contact and transmission of vibrational energy. A fastener, here a bolt 20, tightens and ensures sealing both between the gasket 10 and the pipe flange 14 and between the gasket 10 and the wall flange 4. To join the invention together, each bolt 20 passes through an aperture 16 in flange 14. As discussed above, bolt 20 is insulated from flange vibrations by washer 22 and bushing 12. Bolt 20 then passes through a gasket aperture 17 corresponding to flange aperture 16. The end of bolt 20 is inserted in a wall flange aperture 18 where it can be secured by washer 23 and nut 24.

As an alternative, wall flange aperture 18 can be internally threaded for mating with a threaded bolt 20. The complete assembly thereby provides structural isolation between the pipe 2 and the wall 6 while maintaining a seal against fluid leakage from inside the testing structure 8.

In light of the above, it is therefore understood that within the scope of the following claims, the invention may be practiced otherwise than as specifically described.

What is claimed is:

1. A vibration isolating pipe flange assembly for use with a structure, the assembly comprising:
   a structure provided with an aperture;
   a pipe;
   a flange on said pipe having a first surface and a second surface, wherein the flange includes a plurality of fastener recesses spaced about the first surface of the flange;
   a first vibration dampening material disposed within each fastener recess;
   a wall flange joined in an aperture formed through said structure, having a body portion conforming to said aperture in said structure, and a flange structure formed on at least one end of said body portion, said flange structure having a plurality of fastening apertures formed therethrough;
   a vibration dampening gasket disposed between the wall flange and the second surface of the pipe flange; and
   a plurality of fasteners, each contacting the first vibration dampening material, wherein the fasteners fluid sealingly connects the pipe flange, the vibration dampening gasket and the wall flange.

2. The invention of claim 1 wherein the first vibration dampening material is an elastomer.

3. The invention of claim 1 wherein the vibration dampening gasket is an elastomer.

4. The invention of claim 1 wherein the first vibration dampening material is a polyurethane compound.

5. The invention of claim 1 wherein the vibration dampening gasket is a polyurethane compound.

6. The invention of claim 1 wherein each said fastener comprises a nut and a bolt having a head section, the head section contacting only the first vibration dampening material.

7. A vibration isolating pipe flange assembly for use with a structure, the assembly comprising testing:
   a pipe;
   a flange on said pipe having a first surface and a second surface, wherein the flange includes a plurality of fastener recesses and corresponding fastening apertures spaced about the first surface of the flange and extending therethrough;
   a first vibration dampening material disposed within each fastener recess;
   a wall flange joined in said aperture formed through said testing structure, having a body portion conforming to said aperture in said testing structure, and a flange structure formed on at least one end of said body portion, wherein the flange structure includes a plurality of fastening apertures extending therethrough;
   a vibration dampening gasket disposed between the wall flange and the second surface of the pipe flange, wherein the vibration dampening gasket includes a plurality of fastener apertures; and
   a plurality of fasteners, each contacting the first vibration dampening material, each said fastener comprises a nut and bolt having a head section, the head section contacting the first vibration dampening material, said fasteners extending through each of said pipe flange, vibration dampening gasket and wall flange, wherein the fasteners fluid sealingly connects the pipe flange, the vibration dampening gasket and the wall flange.

8. A vibration isolating pipe flange assembly for use with a structure, the assembly comprising a structure provided with an aperture:
   a pipe;
   a flange on said pipe having a first surface and a second surface, wherein the flange includes a plurality of fastener recesses and corresponding fastening apertures spaced about the first surface of the flange and extending therethrough;
   a first vibration dampening material disposed within each fastener recess;
   a wall flange joined in said aperture formed through said structure, having a body portion conforming to said aperture in said structure, and a flange structure formed on at least one end of said body portion, said flange structure having a plurality of internally threaded fastening apertures formed therethrough;
   a vibration dampening gasket disposed between the wall flange and the second surface of the pipe flange, wherein the vibration dampening gasket includes a plurality of fastener apertures; and
   a plurality of fasteners, each contacting the first vibration dampening material, each said fastener comprises a bolt having a head section, the head section contacting the first vibration dampening material, said fasteners extending through each of said pipe flange, vibration dampening gasket and wall flange, and mating with each said respective internally threaded fastening aperture, wherein the fasteners fluid sealingly connect the pipe flange, the vibration dampening gasket and the wall flange.

* * * * *